(12) United States Patent
Ray et al.

(10) Patent No.: US 7,317,816 B2
(45) Date of Patent: Jan. 8, 2008

(54) ENABLING CONTENT-BASED SEARCH OF OBJECTS IN AN IMAGE DATABASE WITH REDUCED MATCHING

(75) Inventors: Ajoy K. Ray, Kharagpur (IN); Ranjit K. Mishra, Kharagpur (IN); Tinku Acharya, Chandler, AZ (US)

(73) Assignees: Intel Corporation, Santa Clara, CA (US); Indian Institute of Technology (IN)

( * ) Notice: Subject to any disclaimer, the term of this patent is extended or adjusted under 35 U.S.C. 154(b) by 800 days.

(21) Appl. No.: 10/643,672

(22) Filed: Aug. 19, 2003

(65) Prior Publication Data

US 2005/0041863 A1 Feb. 24, 2005

(51) Int. Cl.
*G06K 9/00* (2006.01)

(52) U.S. Cl. ................ 382/118; 382/199; 382/305

(58) Field of Classification Search ............ 382/103, 382/118, 199, 190, 305; 709/204, 205; 355/75; 715/759, 753; 370/260; 379/202.01; 34/117
See application file for complete search history.

(56) References Cited

U.S. PATENT DOCUMENTS 5,719,951 A * 2/1998 Shackleton et al. ......... 382/118
6,128,397 A * 10/2000 Baluja et al. ............... 382/118
6,272,231 B1 * 8/2001 Maurer et al. .............. 382/103
6,345,109 B1    2/2002 Souma et al. ............... 382/118
6,381,346 B1 * 4/2002 Eraslan ...................... 382/118
6,751,340 B2 * 6/2004 Prokoski .................... 382/118

OTHER PUBLICATIONS

Tolga Bozkaya et al., "indexing large metric spaces for similarity search queries association for computing machinery transactions on database system", pp. 1-34, 1999.*
Tolga et al., Indexing large metric spaces for similarity search queiries—IDS, Sep. 1999.*
Behzad Dariush et al., "Spatiotemporal analysis of face profiles" Detection, segmentation, and registration-IEEE 1998.*
A. W.-C. Fu, P. M. S. Chan, Y.-L. Cheung, and Y. S. Moon. "Dynamic vp-tree indexing for n-nearest neighbor search given pair-wise distances". VLDB Journal, 9(2):154-173, Jun. 2000.
Bozkaya, Tolga and Meral Ozsoyoglu. "Indexing Large Metric Spaces for Similarity Search Queries. Association for Computing Machinery Transactions on Database System", pp. 1-34, 1999.
C. Xu and J. L. Prince, "Snakes, Shapes, and Gradient Vector Flow," IEEE Trans. Image Proc., pp. 359-369, Mar. 1998.
U.S. Appl. No. 10/643,467, filed Aug. 19, 2003, Ray et al.

* cited by examiner

*Primary Examiner*—Sheela Chawan
(74) *Attorney, Agent, or Firm*—Trop, Pruner & Hu, P.C.

(57) ABSTRACT

In one embodiment, the present invention includes a method to use active contours to detect image boundaries of a first view and a second view of a human face, and mark a first set of fiducial points on the first view and a second set of fiducial points on the second view. Using the fiducial points, feature vectors may be calculated and stored in a database for later comparison with a query image.

24 Claims, 6 Drawing Sheets

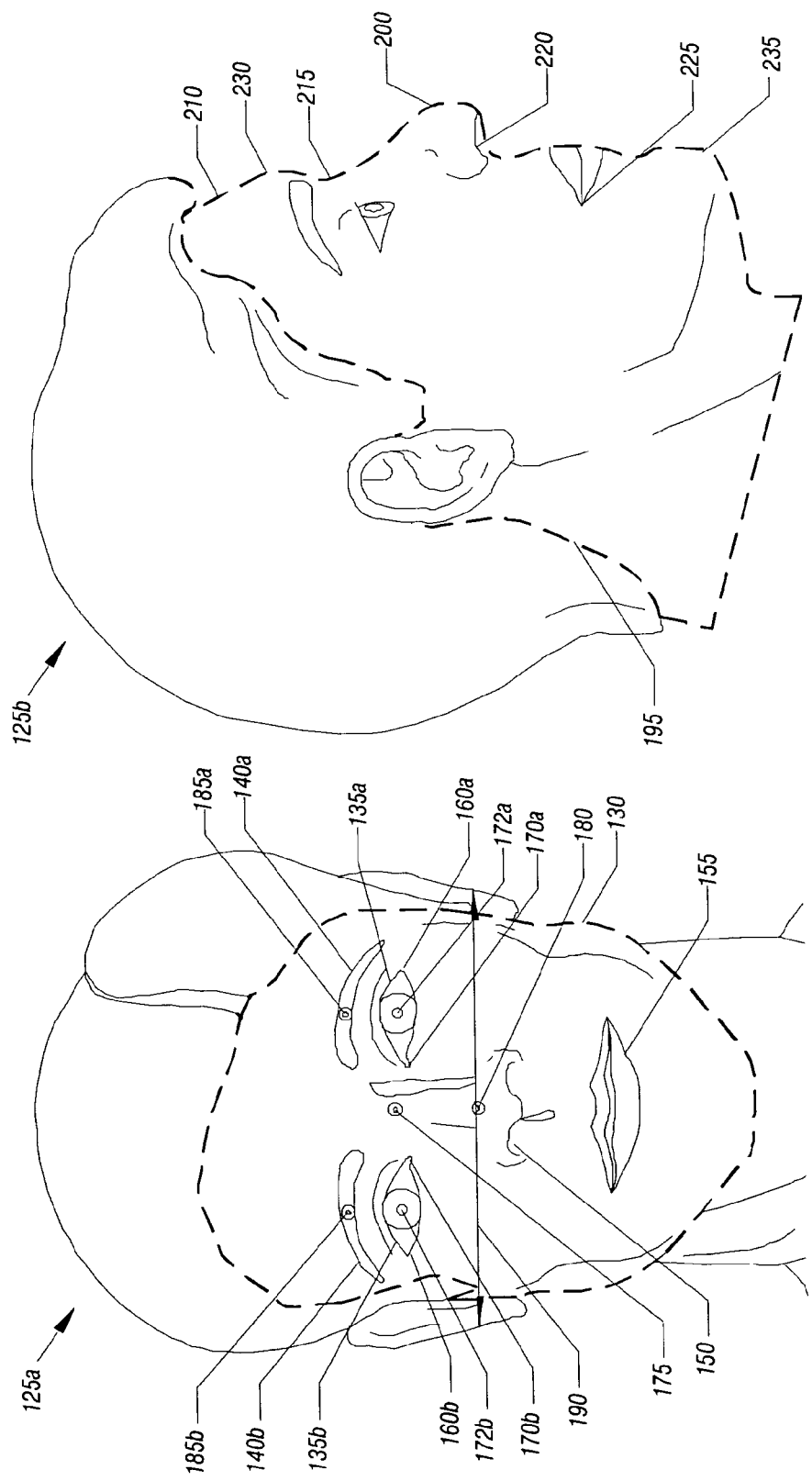

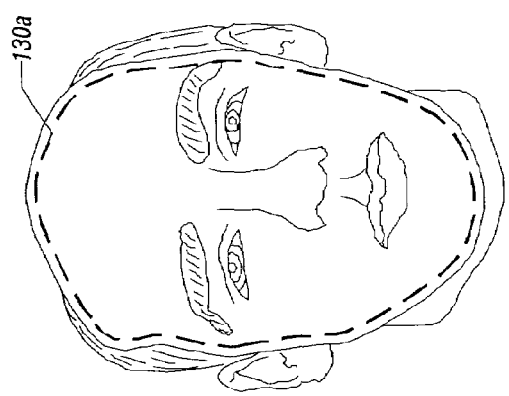
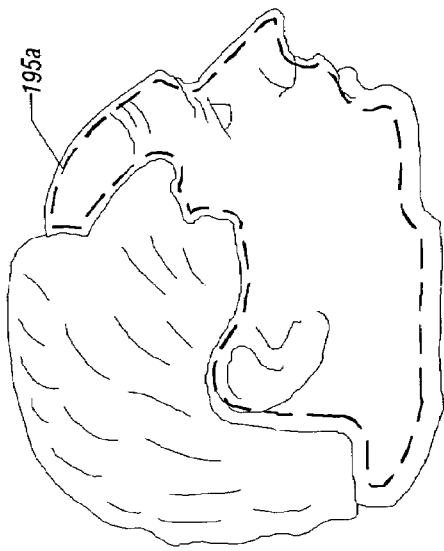
FIG. 6
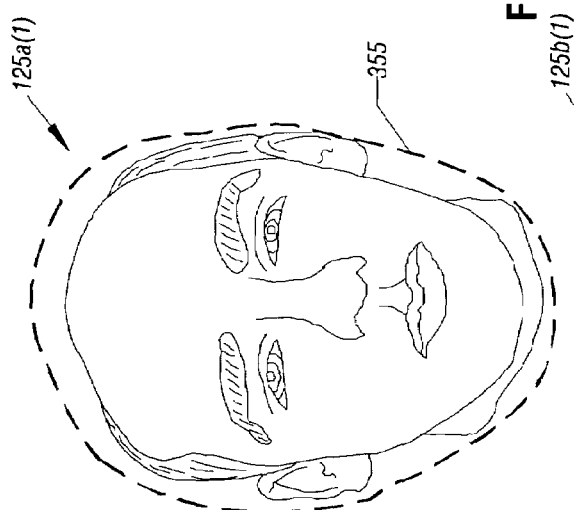
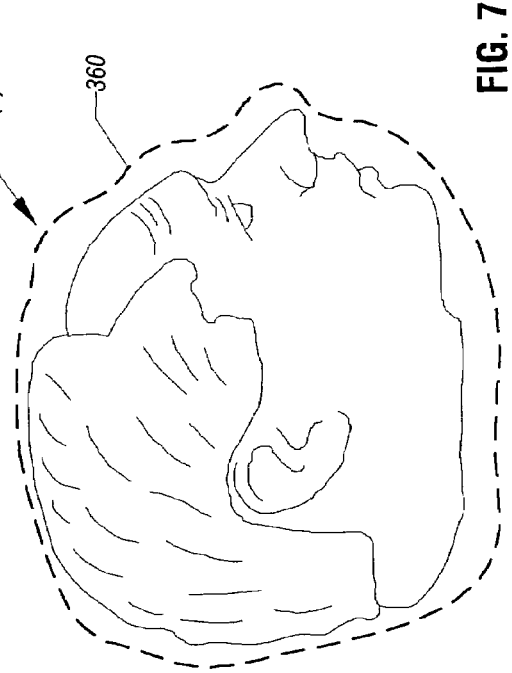
FIG. 7

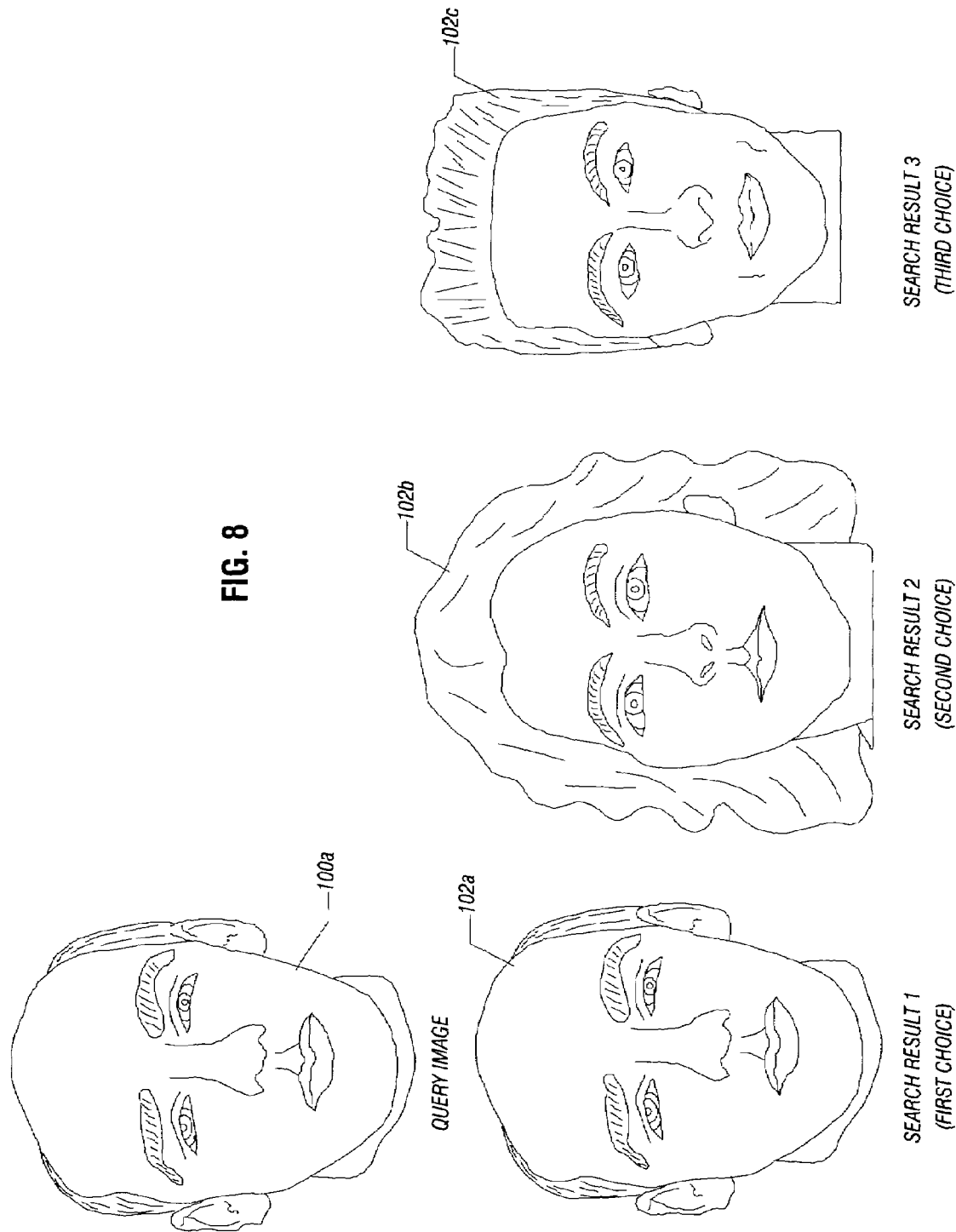

ENABLING CONTENT-BASED SEARCH OF OBJECTS IN AN IMAGE DATABASE WITH REDUCED MATCHING

BACKGROUND

The present invention relates generally to pattern recognition and, more particularly, to enabling a content-based search of objects, such as faces, in an image database with reduced matching.

Identifying a person by his face is one of the most fundamental and seemingly effortless human activities. To impart this capability to a machine has generated a lot of interest in the field of automated face recognition, and a number of implementation approaches have been proposed. Application of such a machine has a broad utility range, varying from photo identification for personal identification, credit card verification, and criminal identification to real time matching of video images in different constraints in terms of processing requirements.

However, present systems require use of a significant amount of features for analysis and the computational requirements of these systems are very high. Thus, significant computer resources are required, and identification is slow and sometimes incorrect, leading to false identification. Thus, there is a continuing need for better ways to be able to search for an image of an object in an image database, such as faces, in a content-based search with reduced matching.

BRIEF DESCRIPTION OF THE DRAWINGS

FIG. 2 is a front view of a human face showing fiducial points for indexing an image thereof using contours in accordance with one embodiment of the present invention.

FIG. 3 is a side view of the human face shown in FIG. 2 according to one embodiment of the present invention.

FIG. 6 is a schematic depiction of one pair of images of a human face showing the front view in accordance with one embodiment of the present invention.

FIG. 7 is a schematic depiction of one pair of images of the human face shown in FIG. 6 in the side view according to one embodiment of the present invention.

FIG. 8 is a schematic depiction of a query image and search results from an image database in accordance with one embodiment of the present invention.

DETAILED DESCRIPTION

In various embodiments, a system may take advantage of explicit information inherently present in both a front and a side view of human face images. Side profile strategy may be used to obtain an outline of the face profile and extract discrete features from it. In such manner, a feature set calculated from the front view may be enriched, providing much richer and explicit information to assist in face recognition.

In certain embodiments, an active contour or snake algorithm (herein a "snake contour", "snakes algorithm", or "snakes") may be used to detect certain boundaries of images. Such active contours may be obtained as discussed in Xu, et al., Snakes, Shapes, and Gradient Vector Flow, IEEE Transactions on Image Processing, pp. 359-369, Vol. 7, No. 3 (March 1998), in one embodiment. In one embodiment, a face boundary may suffice in the case of a side profile. In a front view, the snakes algorithm may be used to detect the face boundary and eye boundaries, eyebrow boundaries, a nose boundary and lip boundary, although the scope of the present invention is not limited in this regard. These snakes are curves defined within an image domain that can move under the influence of internal forces coming from within the curve itself and external forces computed from the image data. These internal and external forces are so defined that snakes may conform to an image boundary or other desired feature within an image. In various embodiments, these forces may be calculated from an energy-based model, and a final curve may evolve from an initial curve under the influence of external potentials while being constrained by internal energies. The initial snakes contour converges iteratively towards the solution of a partial differential equation. In certain embodiments, snakes may be developed around a face image using Gradient Vector Flow (GVF) snake-based contours, as discussed in Xu, et al.

Figure 1:
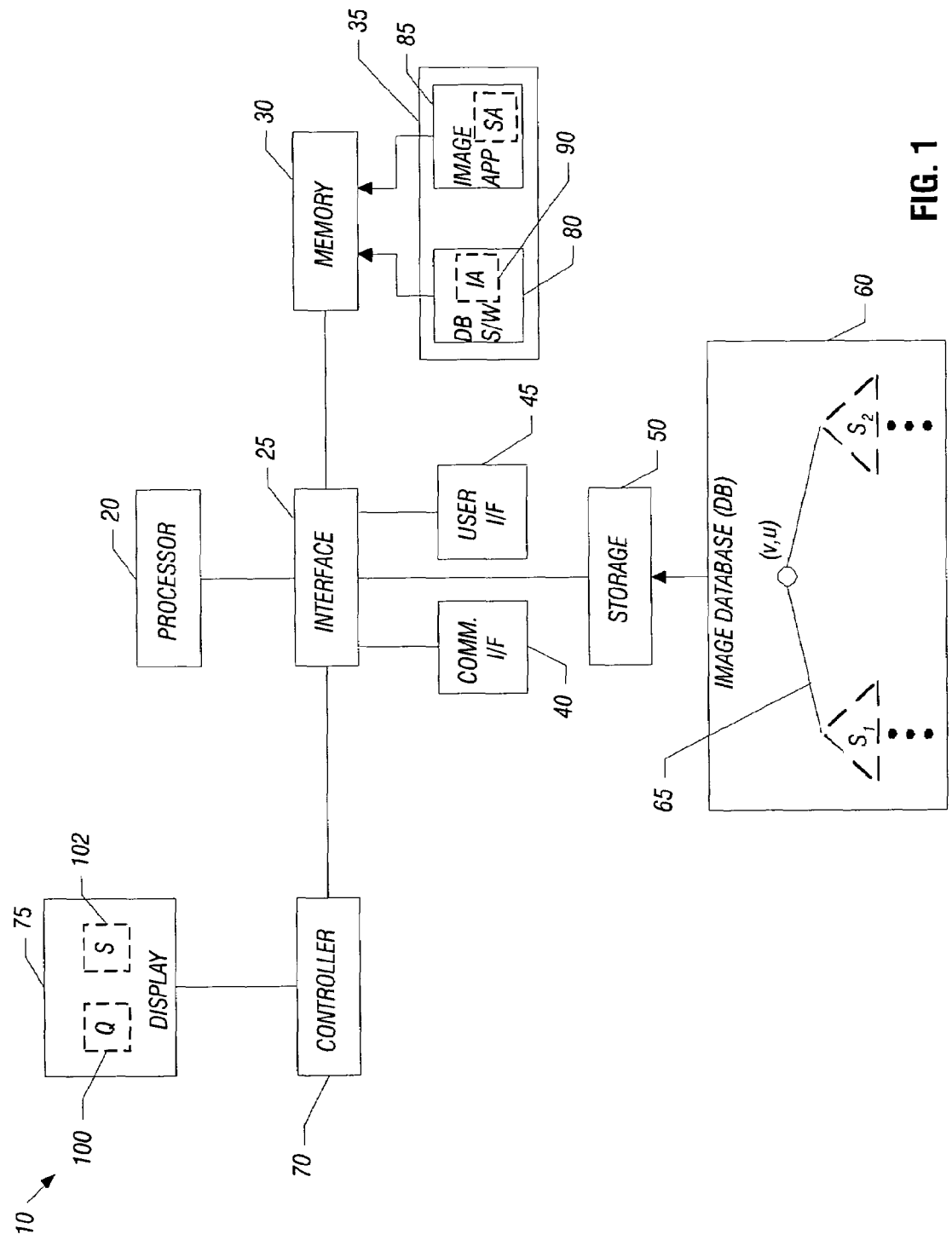
FIG. 1 is a block diagram of a system in accordance with one embodiment of the present invention.

Referring to FIG. 1, a system 10 may include a processor 20 coupled via an interface 25 to a memory 30 storing software 35 to enable a content-based database search of similar images of objects using selected content information according to one embodiment of the present invention. The system 10 may be any processor-based system or device to perform the content-based search. While the system 10 may vary in different embodiments, in one embodiment, system 10 may be a personal computer, notebook computer, a handheld device, or the like. To communicate externally and interactively, the system 10 may include a conventional communication interface (I/F) 40 and a conventional user interface 45, coupling through the interface 25 to the processor 20.

The interface 25 may couple both the processor 20 and the memory 30 to a storage device 50, storing the images of objects in an image database (DB) 60. For example, the images of objects, such as different views of human faces, may be stored in the image database 60 in the form of a binary tree 65 comprising nodes at different levels in a hierarchical manner. Consistent with one embodiment, the software 35 may index the images of objects as a data structure that enables a content-based search with relatively reduced matching of images in the image database 60. This data structure may be metadata that describes the images in a desired form.

In one embodiment, the tree 65 may be a vantage point (vp) tree, providing a distance-based index structure where distance computations between objects of the data domain involve a metric distance function. Using this distance-based index structure, similarity queries may be performed on metric spaces.

By indicating reference data points on the images of objects (i.e., vantage points) for the vp tree 65, the software 35 may partition the data space in the image database 60 into spherical shell-like regions in a hierarchical manner. In this manner, when answering similarity queries, the vp tree 65 may utilize pre-computed distances between reference data points of a query object and the vantage points at a node at a certain level in the distance-based index structure of the vp tree 65. As shown in FIG. 1, in one embodiment each internal node of the structure may include a vantage point (v) and a median value (u) for the branch of which it is part, as will be discussed further below.

For automated face recognition, a controller 70 may couple to the processor 20 via the interface 25 in accordance with one embodiment of the present invention. The controller 70 may couple to a display 75, showing all the images which may be similar to the given query image in the image database 60. To this end, the software 35 may include database software 80 to represent images in the image database 60. In certain embodiments, database software 80 may include an indexer algorithm 90 capable of indexing representations of images in the image database 60. The image searching application 85 may include a search algorithm capable of searching for images of objects in the image database 60 similar to a query image.

In operation, approximate matches to a given query object from a collection of images of objects stored in the image database 60 may be located using the distance-based index structure of the vp tree 65. For example, the image database 60 may be queried to find and retrieve an image in the image database 60 that is similar to a query human image with respect to one or more specified criterion. As a result of the content-based search using the distance-based index structure of the vp tree 65, the image searching application 85 may display a query image 100 and a similar image 102 in the display 75 according to one embodiment of the present invention.

In order to search for similar object images in the image database 60, the vp tree 65 may index the images of objects for similarity search queries. Instead of comparing all distances (obtained from the images), a selected set of distances may be compared for the selected set of features in the vp tree 65, using a feature vector.

A selected distance function for the selected points may compare a feature vector between the query image and the images stored in the image database 60, in some embodiments of the present invention. By comparing each object image, for example, that of the human face, at a feature level using the feature vector comparison whole image comparisons may be obviated. In this manner, for automatic face recognition, a content-based search in the image database 60 may reduce computational overhead, reducing the content for image matching.

By generating the vp tree 65, the image database 60 may be enabled for image detection indicative of whether a particular person's image may be recognized based on at least two views of the face, in some embodiments of the present invention. Distance values in terms of a distance-to-distance function may be computed from fiducial points to compare a query image of a human face with the images stored in the image database 60.

The vp tree 65 may have a multiplicity of nodes, such as a root node and child nodes. Comparing only a child node that is closer than the other child node for a node in the vp tree 65, the image searching application 85 may perform the distance function for half of the vp tree 65, in some embodiments of the present invention. In one embodiment, the image database 60 may include images of human faces being represented by corresponding feature vectors obtained using the image searching application 85 which may apply the snake algorithm to obtain fiducial point information. The fiducial point information may be used to obtain a feature set of distances normalized and stored in the image database 60, using the vp tree 65 data structure, in various embodiments of the present invention.

A feature vector may include data values for distances between the fiducial points for the image of the human face. In this manner, the image of the human face in the image database 60 having a feature vector may be compared with another image of the human face based on individual fiducial points by comparing the feature vectors completely or in a partial manner, as specified by the search algorithm.

To indicate an exact or approximate match, a distance difference, such as a normalized difference, may indicate a relatively close or no match. For example, if the distance difference between a query image 100 and a database face image is relatively high, a mismatch therebetween may be indicated. However, if the normalized distance difference is relatively small, for example, within a similarity measure, a closer match to the query image 100 may be indicated.

Referring now to FIG. 2, shown is a schematic representation of a front view 125a of a human face showing fiducial points in accordance with one embodiment of the present invention. As shown in FIG. 2, a face boundary 130 (shown in FIG. 2 as a dashed line) may be detected. In one embodiment, the image searching application 85 may use a conventional snake algorithm to detect the face boundary 130, identifying the outline of the face profile in the front view 125a. For example, the snake algorithm may be initialized around the human face and converged using gradient vector flow (GVF) snake-based contours. In addition, other boundaries including eye boundaries 135a, 135b, eye brow boundaries 140a, 140b, nose boundary 150, and lip boundary 155 may also be detected using a snakes algorithm, in one embodiment.

For human face recognition in accordance with one embodiment of the present invention, the image searching application 85 may provide a relatively richer feature set using a face profile of a side view. Referring now to FIG. 3, shown is a side view 125b of the face of FIG. 2. Using side view 125b, a feature set obtained from the front view 125a may be enriched using a feature set having discrete features indicative of the outline of the face profile 195 (shown by the dashed line in FIG. 3) in the side view 125b. In this manner, an enriched feature set based on the properties of image content in both the front and side views 125a, 125b may be generated. While discussed as using front and side views, it is to be understood that other views may be used in other embodiments.

After marking of fiducial points on the front and side views 125a, and 125b, feature vectors may be calculated by measuring pair wise distances between the marked points. For the features in the side view 125b, all distances may be normalized in terms of nose to chin distance, in one embodiment. Likewise, the features extracted in the front view 125a may be normalized in terms of distance between eye centers to nose tip, in one embodiment.

Figure 4A:
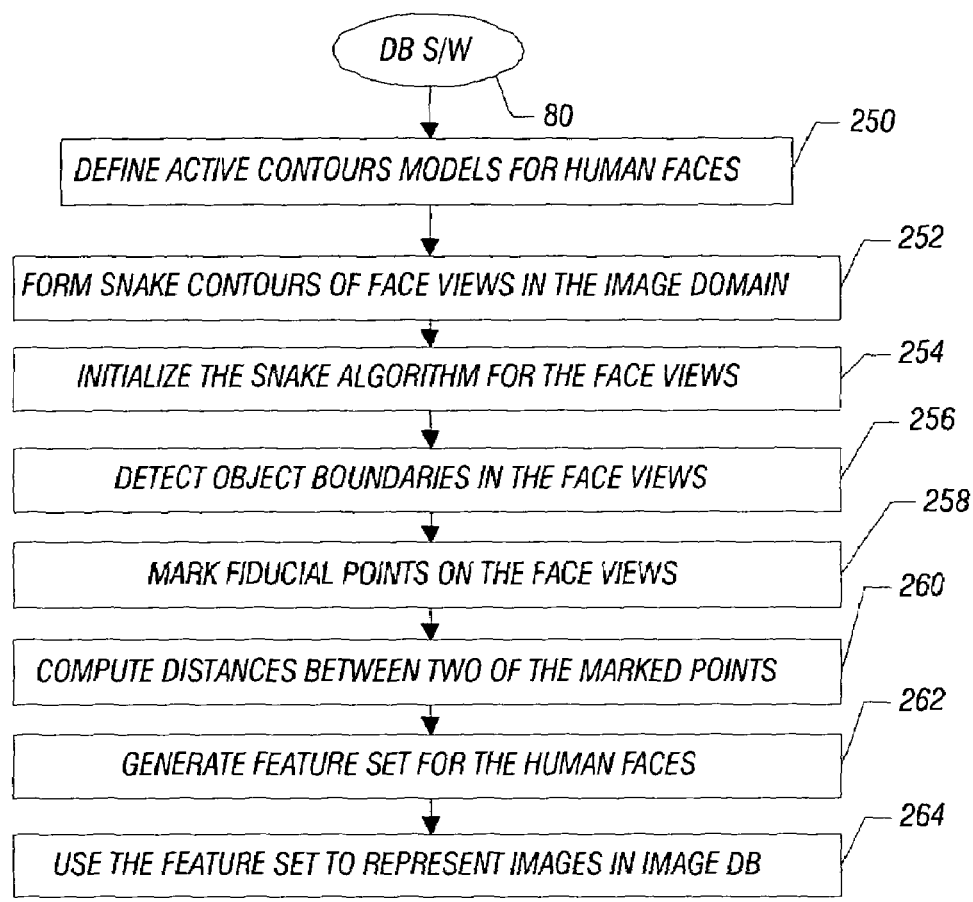
FIG. 4A is a flow diagram of database (DB) software for the system shown in FIG. 1 in accordance with one embodiment of the present invention.

Referring to FIG. 4A, shown is a flow diagram of database software 80 in accordance with some embodiments of the present invention. As shown in FIG. 4A, the database software 80 may define active contour models for human faces, for example, faces to be stored in the image database 60 shown in FIG. 1 (block 250). The database software 80 may form snake contours of face views in an image domain (block 252). For example, snake contours of the front and side face views 125a, 125b shown in FIG. 2 and FIG. 3 may be formed in the image domain in accordance with one embodiment of the present invention. For the purpose of obtaining boundaries in the front and side face views 125a, 125b, the database software 80 may initialize the snake algorithm (block 254). Object boundaries, such as the face boundary 130 in the front face view 125a shown in FIG. 2 and the side view boundary 195 in the side face view 125*b* shown in FIG. 3 may be detected (block 256).

On the face views 125*a*, 125*b*, one or more fiducial points may be marked as reference points at block 258 consistent with many embodiments of the present invention. Pair wise distances between certain ones of the marked points may be computed at block 260.

Using the fiducial points, a feature set may be generated for the human faces (block 262). In certain embodiments, a feature set may be generated for each view. The feature sets may be used to represent images in the image database 60 in accordance with some embodiments of the present invention (block 264). That is, the feature sets may be stored in the image database 60 as metadata.

Figure 4B:
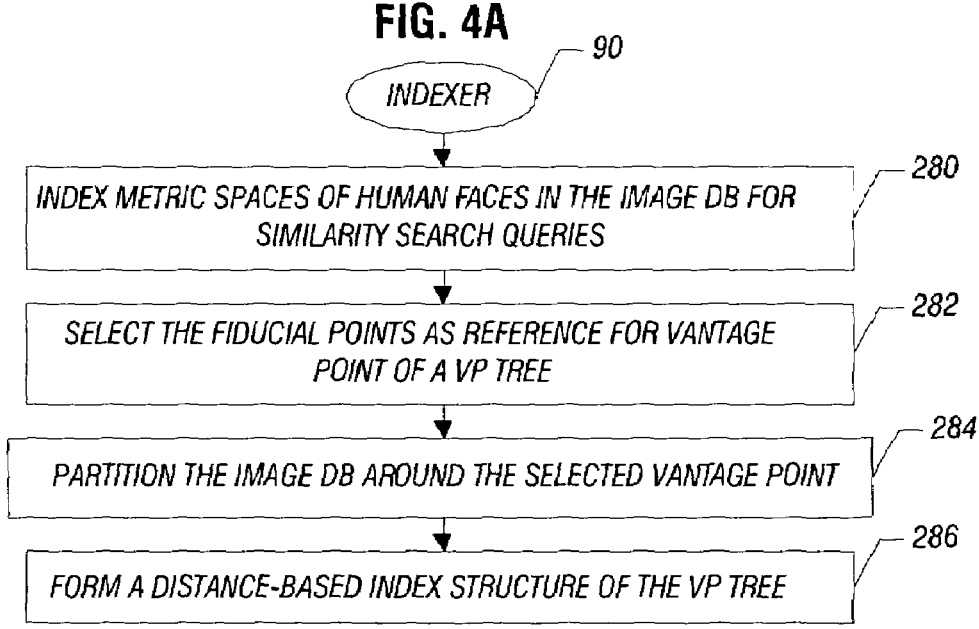
FIG. 4B is a flow diagram of an indexer algorithm in accordance with one embodiment of the present invention.

Referring to FIG. 4B, shown is a flow diagram of an indexing method in accordance with one embodiment of the present invention. As shown in FIG. 4B, the indexer algorithm 90 may index metric spaces of the human faces in the image database 60 for enabling similarity search queries in accordance with some embodiments of the present invention (block 280). Next, fiducial points may be selected as reference for a vantage point of a vp tree (block 282). For example, inner and outer eye point locations may be selected as reference for a vantage point of vp tree 65 in the image database 60.

Then, the image database 60 may be partitioned around the selected vantage point in some embodiments (block 284). Using a feature vector obtained from the fiducial points, the indexer algorithm 90 may form a distance-based index structure of the vp tree 65 (block 286). In such manner, content-based searching of human faces may be enabled in the image database 60 with reduced matching therebetween.

Figure 5:
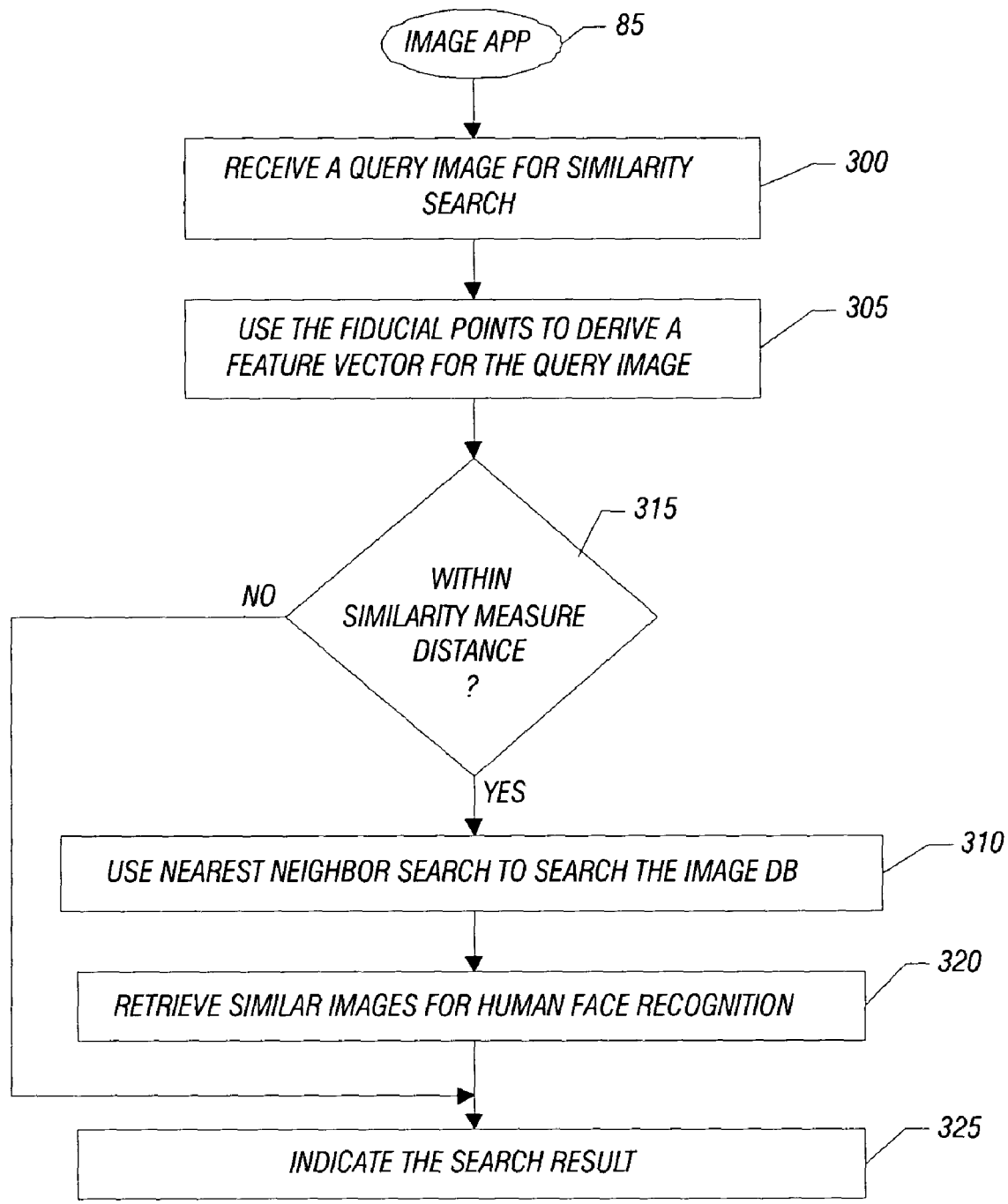
FIG. 5 is a flow diagram of an image searching application in accordance with one embodiment of the present invention.

Referring to FIG. 5, shown is a flow diagram of an image searching method in accordance with one embodiment of the present invention. As shown in FIG. 5, the image searching application 85 may receive a query image for undertaking a similarity search in accordance with one embodiment of the present invention (block 300). The image searching application 85 may use fiducial points of the query image to derive a feature vector for the query image (block 305). For example, the same fiducial points discussed above in formation of the vp tree 65 may be used to derive a feature vector.

The feature vector may be compared to a corresponding feature vector of a node of vp tree 65. Based on that comparison, it may be determined whether the query feature vector is within a similarity measure distance (r) of the feature vector of the node (diamond 315). If not, the query image is markedly different than all of the entries in the image database 60 with respect to the feature vector. Accordingly, control may pass to block 325 in which the search result is indicated. In other words, the display 75 may indicate that no similar images are present in image database 60.

Alternately, if it is determined that the feature vector of the queried node is within a similarity measure distance, the image database may be searched using a nearest neighbor search, for example (block 310), although any suitable search technique may be deployed to search the image database 60 to identify a similar image to the query image, such as the similar image 102 corresponding to the query image 100. After such searching identifies a node within the hierarchical tree structure of vp tree 65 that is nearest to the feature vector of the query image, similar images to the query image may be retrieved for human face recognition (block 320), and the search result indicated (block 325). In such manner, the query image 100 and the similar image 102 may be displayed on display 75, in one embodiment.

Thus, for searching images in an image database system, pattern recognition techniques that enable an automatic content-based search may be deployed. One such scheme involves an automatic content-based search of an image of an object, e.g., a human face, providing a solution set of face images that best matches a query image. The vectors of a query image and resident face images (i.e., a collection of the face images) may be compared in a vector space. The solution set may be identified based on a distance between the query image in the vector space and each of the resident face images, which is calculated according to a desired distance function such as a Euclidean distance function. Thus, a distance-based index structure may be employed in order to retrieve all images which are similar to the given query image in the image database. The searching approach partitions data space into spherical shell like regions in the hierarchical manner using vantage points.

In an embodiment for human face recognition, for marking fiducial points on the front view, a multiplicity of reference points and locations thereof may be found on a face. Namely, inner and outer eye point locations, eye center, nose tip, eye brow point, and face width may be determined in one example embodiment. In such an embodiment, the location of inner and outer eye points may be found from snake contours converging around the two eyes. All the pixel values around each eye location are available. Referring to FIG. 2, for the right eye, the leftmost point 160*b* gives the outer eye point and the rightmost point 170*b* gives the inner eye point. The mid-point of these two yields the iris center 172*b*. Similarly, for the left eye, the rightmost pixel location 160*a* gives the outer eye point while the leftmost pixel 170*a* gives the inner eye point. The mid point of these two is the iris center 172*a* for the left eye.

In one embodiment, the mid point between the two iris centers of the two eyes calculated above gives eye center 175. This point may be identical to the bridge point calculated from the side profile, as will be discussed below. In one embodiment, a snake contour converging on the nose area may yield a set of pixel values from which the nose point, i.e., the tip of the nose can be calculated. The mid point between the two extremes of all the nose points gives the nose tip. As shown in FIG. 2, nose tip 180 may thus be determined. On both the eyebrows a snake contour converges, providing the eye brow point. From all these points, the two extreme points may be chosen, and the mid point of the two extreme points of all the eyebrow points yields the central point 185*a*, 185*b*, respectively on the eyebrows. These points are also directly above the iris centers 172*a* and 172*b* of the corresponding eyes. In one embodiment, the snakes contour around the whole face may be used to calculate the face width 190 at the nose tip location 180. The leftmost and the rightmost points on the face boundary are noted to calculate the face width at nose tip location.

In an embodiment for human face recognition, in order to mark fiducial points on the side view, a multiplicity of reference points and locations thereof may be found on a face. The multiplicity of reference points and locations may include but are not limited to, a nose point, a chin point, a forehead point, a bridge point, a nose bottom point, a lip bottom point, and a brow point.

In such an embodiment, the nose point may be the rightmost point of the side profile as the protrusion of nose is maximum in any normal human face. For example, referring to FIG. 3, point 200 is the noise point. In case there is more than one such point, the bottommost point may be selected as the nose point. For determining the chin point, lines may be drawn recursively from the nose point to all points below it on the profile and the angle of these lines with the vertical or horizontal is calculated. The point on the lower profile which gives the maximum angle with the horizontal or the minimum angle with the vertical, may be taken as the chin point 235, in one embodiment.

The point on the profile above the nose point whose distance from the nose point is same as the distance between the nose point and chin point may be taken as the forehead point 210, in one embodiment. The bridge point 215 lies on the profile between the nose point 200 and the forehead point 210. The equation of the line joining the forehead point and nose point may be calculated. From this line, perpendiculars may then be drawn to all points on the profile which lie between these two points. The point having maximum perpendicular distance from the line joining the nose point and forehead point is marked as the bridge point. The tangent to the angle between the nose point and all points between nose point and chin point may be calculated. In one embodiment, the point with the minimum angle with the horizontal or maximum angle with the vertical may be marked as nose bottom point 220. Further, the leftmost point between chin point and nose bottom point is marked as the lip bottom point, also known as chin curve point 225. If there are more than one such point in succession, the central point out of these is marked as the lip bottom point. The brow point may be the most raised point between forehead point 210 and bridge point 215. The rightmost point between forehead point and bridge point is marked as brow point 230 in FIG. 3.

In one embodiment, after marking all the points on the front view and side view, feature vectors may be calculated by measuring a distance between two of the marked points. For example, a predetermined feature set of feature vectors may be calculated for each of the side view and front view. In one embodiment, seven features of the front view of the human face image and seven features of the side view of the human face image may be extracted using active contours or snakes. In such an embodiment, a side view may include the following:

1. nose to forehead distance (Dn-fh);
2. nose to bridge distance (Dn-b);
3. nose to nose bottom distance (Dn-nb);
4. brow to bridge distance (Db-b);
5. brow to chin distance (Db-c);
6. nose to chin distance (Dn-c); and
7. nose bottom to lip bottom distance (Dnb-lb).

In such an embodiment, all distances may be normalized. For example, the distances may be normalized in terms of nose to bridge distance, in one embodiment.

In one embodiment, a front view may include the following feature vectors:

1. distance between left and right iris center (Dle-re);
2. distance between two inner eye points (Diep);
3. distance between two outer eye points (Doep);
4. distance between eye center to nose tip (Dec-nt);
5. distance between left iris center and left eyebrow (Dlic-leb);
6. distance between right iris center and right eyebrow (Dric-reb); and
7. face width at nose tip (Dfw).

In such an embodiment, all distances may be normalized. For example, the distances may be normalized in terms of distance between eye center to nose tip, in one embodiment.

Referring now to Tables 1 and 2 below, shown are feature sets for a side view and a front view, respectively, of an example face in accordance with one embodiment of the present invention:

TABLE 1

| | |
|---|---|
| Nose to forehead distance | 1.2606 |
| Nose to bridge distance | 1.0000 |
| Nose to nose bottom distance | 0.0942 |
| Brow to bridge distance | 0.3863 |
| Brow to chin distance | 2.0442 |
| Nose to chin distance | 1.2608 |
| Nose bottom to lip bottom distance | 0.6246 |

TABLE 2

| | |
|---|---|
| distance between left and right iris center | 1.4654 |
| distance between two inner eye points | 1.0652 |
| distance between two outer eye points | 1.9856 |
| distance between eye center to nose tip | 1.0000 |
| distance between left iris center and left eyebrow | 0.4676 |
| distance between right iris center and right eyebrow | 0.4676 |
| face width at nose tip | 2.7886 |

As shown in Tables 1 and 2, the values may be normalized with respect to nose to bridge distance and eye center to nose tip, respectively. The above feature sets may be used to completely and uniquely represent a pair of images in an image database.

After determining feature sets for front and side views of a face, the feature sets may be stored. For example, in the embodiment of FIG. 1, the feature sets may be stored in a memory such as storage 50. More specifically, in the embodiment of FIG. 1, feature sets may be stored in image database 60 in nodes of vp tree 65 as metadata of the images from which the sets were obtained. In such manner, in certain embodiments, a query image may be searched against similar images in image database 60 in an efficient manner.

Thus in an embodiment in which images in the database are stored in a vantage point tree, the database may be indexed for similarity search queries using the vantage point tree. In such an embodiment, the database may be partitioned around selected points (i.e., vantage points) at different levels to form a hierarchical tree structure. This structure may be used to effectively filter similarity search queries. In one embodiment, the internal nodes in the vp tree may be of the form $(S_v, M, R_{ptr}, L_{ptr})$, where $S_v$ is the vantage point, M is the median among the distance of all the points from $S_v$ indexed below that node, and $R_{ptr}$ and $L_{ptr}$ are pointers to left and right branches of the tree, respectively. In one embodiment, a preselected one of the feature vectors of the front view may be selected as the vantage point. The pointers may be addresses to locations within vp tree 65 where the next lower branch is located.

In one embodiment, the left branch of the node indexes may be the points whose distance from $S_v$ are less than or equal to M, and the right branch may include nodes with distances greater than M, although the scope of the present invention is not limited in this regard. Given a finite set $S=\{S_1, S_2, \ldots, S_n\}$ of n objects and a metric distance function d $(S_i, S_j)$, a binary vp tree 65 on S may be constructed as follows in one embodiment. First, if n(S)=0, create an empty tree; then let Sv be an arbitrary object of S. Further, $M$=median of $\{d(Si, Sv)|Si \in S\}$; and $S_L=\{Si|d(Si, Sv)<M\}$; and $S_r=\{Si|d(Si, Sv)>M\}$.

By using a median value in the inequalities, the tree may be balanced because of equal cardinality of the two sides and the construction requires O(n log₂ n) distance computations where n is the number of objects.

After forming a vp tree 65 in accordance with an embodiment of the present invention, the image database 60 may be searched using a query image. Because of the hierarchical tree structure of vp tree 65, searching may be performed rapidly in accordance with the following algorithm in one embodiment. Specifically, for a given query object Q, the data objects within distance r from Q may be found as follows:

1. If d(Q, Sv)<r, then Sv is in the answer set;

2. If d(Q, Sv)+r>M, recursively search the right branch; and

3. If d(Q, Sv)−r<M, recursively search the left branch.

Here "r" is generally referred to as a similarity measure or tolerance factor. In certain embodiments, a variation of a near neighbor search may be used. For example, a nearest neighbor search which asks for the image that has the minimum distance to a given query image may be sought. Alternately, the search may be extended when the k-nearest neighbors are sought.

Referring now to FIG. 6, shown is a front view of a human face 125*a* (1) in which an initial snake-based contour 355 is shown. The initial snake contour may converge in a gradient vector flow snake 130*a*, as shown in FIG. 6. Similarly, referring to FIG. 7, shown is a side view 125*b* (1), showing an initial snake-based contour 360 which may converge to the gradient vector flow snake contour 195*a*. In an example performed on an image having a size of 274 pixels by 350 pixels, a front view snake contour took about 980 seconds to converge, while a side view snake contour took approximately 650 seconds to converge. This example was performed on a personal computer system operating using a WINDOWS™ operating system and having an INTEL® PENTIUM™ processor (operating at 450 Megahertz (MHz)). In the example, the GVF snakes were implemented using MATLAB™ code.

Referring now to FIG. 8, shown is a schematic depiction of a query image 100*a* in accordance with one embodiment of the present invention. As shown in FIG. 8, query image 100*a* may be used to query an image database 60. Further shown are the results of the query indicating a first choice search result 102*a*, a second choice search result 102*b*, and a third choice search result 102*c*. Such results may be obtained, in one embodiment, using a k-nearest neighbor method with k=3. In such manner, a first, second, and third choice for a corresponding match of a face image may be determined, with the closeness between different feature vectors of the query image 100*a* and the search results 102 determining first, second, and third choices.

Embodiments of the present invention may be implemented in code and may be stored on a storage medium having stored thereon instructions which can be used to program a system, such as system 10 to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions, including programmable storage devices.

While the number of features to be extracted from contours of images may vary, in certain embodiments, less than ten such features may be extracted from a front image, and similarly less than ten features may be extracted from a side image. In such manner, in certain embodiments computational requirements may be lessened and analysis may be performed more rapidly. Accordingly, in certain embodiments, facial recognition may be performed using lower power devices, such as handheld devices or other such systems. In one such embodiment, an identification system may be used to perform biometric analysis for identification of individuals seeking access to a secure environment, for example. In such a system, a video capture device may be used to obtain front and side images of an individual and process those images in a system. If positive identification of the individual is achieved, the individual may be given access to the secure environment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using active contours to detect image boundaries of a first view and a second view of a human face; and
   marking a first set of fiducial points on the first view and a second set of fiducial points on the second view.

2. The method of claim 1, including:
   determining a first feature set using the first set of fiducial points, and determining a second feature set using the second set of fiducial points.

3. The method of claim 2, further comprising:
   normalizing distances in the first feature set in terms of a distance between two preselected fiducial points of the first set of fiducial points.

4. The method of claim 2, wherein the first feature set and the second feature set each comprise less than ten distances.

5. The method of claim 2, further comprising storing the first feature set and the second feature set in a database.

6. The method of claim 5, further comprising:
   partitioning said database based on a feature vector of one of the first feature set and the second feature set.

7. The method of claim 6, further comprising:
   in response to a query image, querying the database using reference image content corresponding to the feature vector.

8. The method of claim 1, wherein the active contours comprise snake contours and the first and second views comprise a front view and a side view.

9. The method of claim 8, wherein the snake contours for the front view comprise at least two of a face boundary, an eye boundary, a brow boundary, a nose boundary, and a lip boundary.

10. A method comprising:
    obtaining feature set information including fiducial points from a first view of a human face and a second view of the human face; and
    storing the feature set information in a database having a hierarchical tree structure.

11. The method of claim 10, wherein the database includes feature set information for a plurality of individuals.

12. The method of claim 11, further comprising searching the database for at least one search result corresponding to a query image.

13. The method of claim 10, further comprising determining whether to store the feature set information in a first branch or a second branch of the hierarchical tree structure based upon a value in the feature set information.

14. The method of claim 13, wherein the value corresponds to a metric distance function.

15. The method of claim 13, further comprising searching the first branch or the second branch for a search result corresponding to a query image based on a metric distance function of the query image.

16. An article comprising a machine-readable storage medium containing instructions that if executed enable a system to:
obtain feature set information including fiducial points from a first view of a human face and a second view of the human face; and
store the feature set information in a database having a hierarchical tree structure.

17. The article of claim 16, further comprising instructions that if executed enable the system to determine whether to store the feature set information in a first branch or a second branch of the hierarchical tree structure based upon a value in the feature set information.

18. The article of claim 17, further comprising instructions that if executed enable the system to search the first branch or the second branch for a search result corresponding to a query image based on a metric distance function of the query image.

19. The article of claim 16, further comprising instructions that if executed enable the system to search the database for at least one search result corresponding to a query image.

20. A system comprising:
a dynamic random access memory containing instructions that if executed enable the system to use active contours to detect image boundaries of a first view and a second view of a human face, and to mark a first set of fiducial points on the first view and a second set of fiducial points on the second view; and
a processor coupled to the dynamic random access memory to execute the instructions.

21. The system of claim 20, further comprising instructions that if executed enable the system to determine a first feature set using the first set of fiducial points, and determine a second feature set using the second set of fiducial points.

22. The system of claim 21, further comprising instructions that if executed enable the system to store the first feature set and the second feature set in a database.

23. The system of claim 22, further comprising instructions that if executed enable the system to partition the database based on a feature vector of one of the first feature set and the second feature set.

24. The system of claim 22, further comprising a display coupled to the processor to display a query image and at least one search result image obtained from the database in response to a similarity query based on at least one feature vector.

* * * * *